(12) United States Patent (10) Patent No.: US 8,931,745 B2
Ng (45) Date of Patent: Jan. 13, 2015

(54) SECURING AND SUPPORTING APPARATUS FOR MOBILE ELECTRONIC DEVICES

(71) Applicant: Innomax Limited, Hong Kong (HK)

(72) Inventor: Wai Kit Ng, Hong Kong (HK)

(73) Assignee: Innomax Limited, Kowloon, Hong Kong (HK)

( * ) Notice: Subject to any disclaimer, the term of this patent is extended or adjusted under 35 U.S.C. 154(b) by 0 days.

(21) Appl. No.: 14/020,912

(22) Filed: Sep. 9, 2013

(65) Prior Publication Data

US 2014/0076745 A1 Mar. 20, 2014

(51) Int. Cl.
| | |
|---|---|
| *A47G 1/17* | (2006.01) |
| *A45C 11/00* | (2006.01) |
| *H04M 1/04* | (2006.01) |
| *A45C 13/18* | (2006.01) |
| *G06F 1/16* | (2006.01) |
| *B60R 11/02* | (2006.01) |
| *F16B 1/00* | (2006.01) |
| *H04B 1/38* | (2006.01) |

(52) U.S. Cl.
CPC .................. *A45C 11/00* (2013.01); *H04M 1/04* (2013.01); *A45C 13/18* (2013.01); *G06F 1/1613* (2013.01); *B60R 11/0252* (2013.01); *F16B 2001/0035* (2013.01); *H04B 1/3888* (2013.01); *A45C 2011/002* (2013.01)
USPC ...................... 248/206.5; 248/683; 248/309.4

(58) Field of Classification Search
CPC ....... H04M 1/04; H04M 1/10; H04M 1/0235; H04B 1/3888; B60R 11/0252; B60R 11/0241; B60R 2011/007; F16B 2001/0035; G06F 1/1613; G06F 1/1616; G06F 1/1626; A45C 11/00; A45C 13/18; A45C 2011/002; F16M 13/00; A47G 1/17

USPC ............ 248/206.5, 309.4, 683; 379/446, 455; 206/818; 16/320; 455/575.1; 361/679.3, 679.55, 679.56
See application file for complete search history.

(56) References Cited

U.S. PATENT DOCUMENTS

| | | | |
|---|---|---|---|
| 6,058,185 A | 5/2000 | Alanaerae | |
| 6,135,408 A | 10/2000 | Richter | |
| 8,408,513 B2 * | 4/2013 | Smith | ........................... 248/682 |
| 2011/0064401 A1 * | 3/2011 | Desorbo | ........................ 396/419 |
| 2011/0192857 A1 | 8/2011 | Rothbaum et al. | |

OTHER PUBLICATIONS

Search Report issued from the European Patent Office on Feb. 17, 2014.

* cited by examiner

*Primary Examiner* — Todd M Epps
(74) *Attorney, Agent, or Firm* — Ella Cheong Hong Kong; Sam T. Yip

(57) ABSTRACT

An apparatus for securing and supporting a mobile electronic device, comprising a protective shell for mounting the mobile electronic device, the protective shell comprising a female connector, wherein the female connector having a first magnet; and a support for fixing to a supporting surface, the support comprising a male connector, wherein the male connector having a second magnet; wherein the protective shell and the support constitute a detachable connecting structure; and wherein exposed ends of the first magnet and the second magnet having opposite magnetic poles. When joining the protective shell and the support, the male and female connectors need only be placed in approximate of each other for the connectors to be drawn towards each other and guided into proper alignment by magnetic force exerted by the two magnets. This way, the user's sight on the joining process is not necessary.

2 Claims, 5 Drawing Sheets

SECURING AND SUPPORTING APPARATUS FOR MOBILE ELECTRONIC DEVICES

CLAIM FOR FOREIGN PRIORITY

This application claims priority under 35 U.S.C. §119 to the China Utility Model Patent Application No. 201220477217.8, filed Sep. 19, 2012, the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The presently claimed invention relates generally to apparatuses used in securing and supporting mobile electronic devices on to persons or articles.

BACKGROUND

To secure a mobile electronic device, such as a mobile phone, tablet, laptop computer, or navigator, inside an automobile and water vessel passenger compartment, on motorcycle, bicycle, or a person's body, etc. for ease of use, a supporting and securing structure is generally necessary for attaching the device on to some fixture.

A common mobile electronic device supporting and securing accessory can comprise a protective shell for mounting the mobile electronic device and a support fixed to a supporting surface, wherein the protective shell and the support constitute a detachable connecting structure. The protective shell is provided with a female connector while the support is provided with a male connector. The protective shell and the support are connected together by their respective connectors, the device is secured within the protective shell, the support is fixed on to the supporting surface, and ultimately the mobile electronic device is secured for use.

The entire installation process is simple. However, if the mobile electronic device is large in size or that the user's line of sight is obscured, it is difficult to align the protective shell and the support's connectors to join them together, resulting in difficult fitting and installation.

SUMMARY

It is the objective of the presently claimed invention to overcome the shortcoming of the prior art; that is, the difficulty in joining the mobile electronic device in its protective shell to the support in providing the securing and supporting structure for the mobile electronic device.

It is the objective of the presently claimed invention to provide an apparatus for securing and supporting mobile electronic devices. In one embodiment, the securing and supporting apparatus comprising a protective shell for mounting a mobile electronic device and a support fixed to the supporting surface, wherein the protective shell and the support constitute a detachable connecting structure. The protective shell is provided with a female connector. The female connector is provided with a slot and a fastening end for connecting a male connector. The support is provided with a male connector, the male connecter is provided a fastener. For connecting the male and female connectors, the male connector is inserted into the slot and connected with the female connector in a sliding manner, then the fastener of the male connector is fastened to the fastening end of the female connector, as such the male connector is connected to the female connector.

In accordance to one embodiment, the interior of the male connector is installed a permanent magnet having a convex shape, and the interior of the female connector is installed another permanent magnet having a concave shape. The magnetic poles of the exposed ends of the two magnets are of opposite of each other, so that when the male connector is inserted into the slot of the female connector, the female connector magnet attracts the male connector magnet. The magnets are used for aiding the alignment of the male and female connectors while the male connector is being inserted into the slot of the female connector. When joining the protective shell and the support, the male and female connectors need only be placed in approximate of each other for the connectors to be drawn towards each other and guided into proper alignment by magnetic force exerted by the two magnets. This way, the user's sight on the joining process is not necessary.

BRIEF DESCRIPTION OF THE DRAWINGS

Embodiments of the invention are described in more detail hereinafter with reference to the drawings, in which.

DETAILED DESCRIPTION

Figure 1:
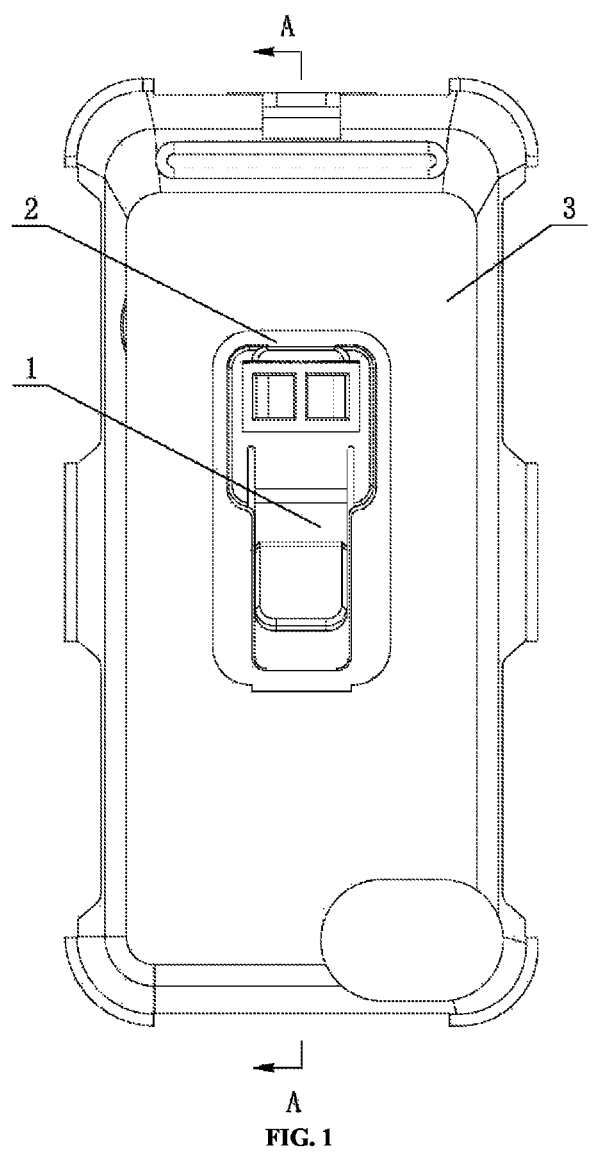
FIG. 1 is a schematic structural view of one embodiment of the presently claimed invention.
Figure 2:
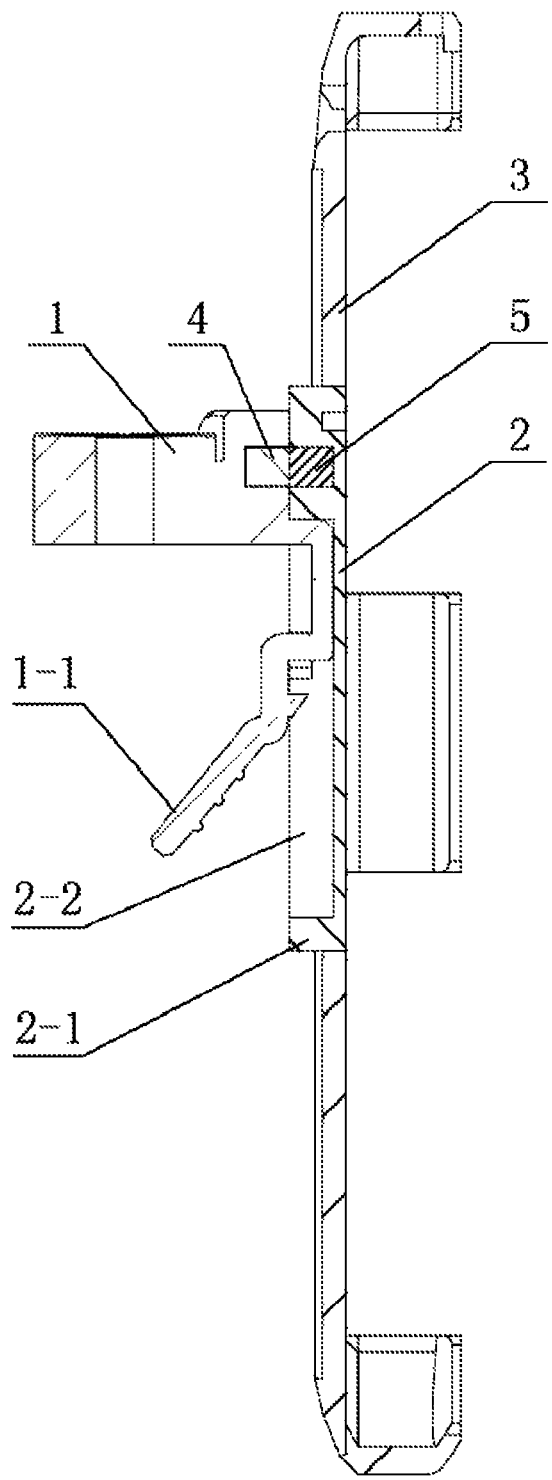
FIG. 2 is an A-A sectional view of FIG. 1.
Figure 3:
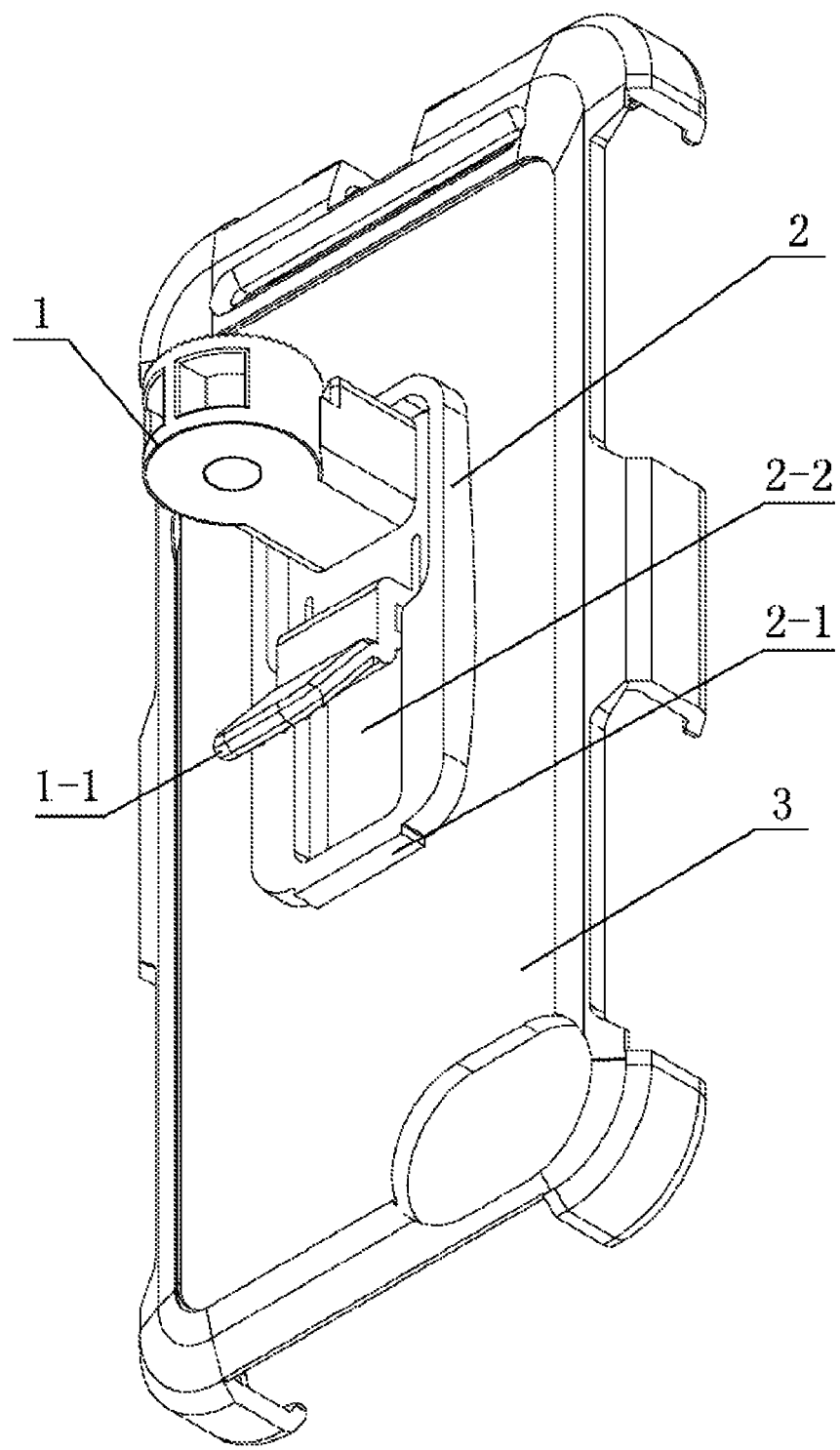
FIG. 3 is a schematic structural view of one embodiment of the presently claimed invention under an unlocked state.
Figure 4:
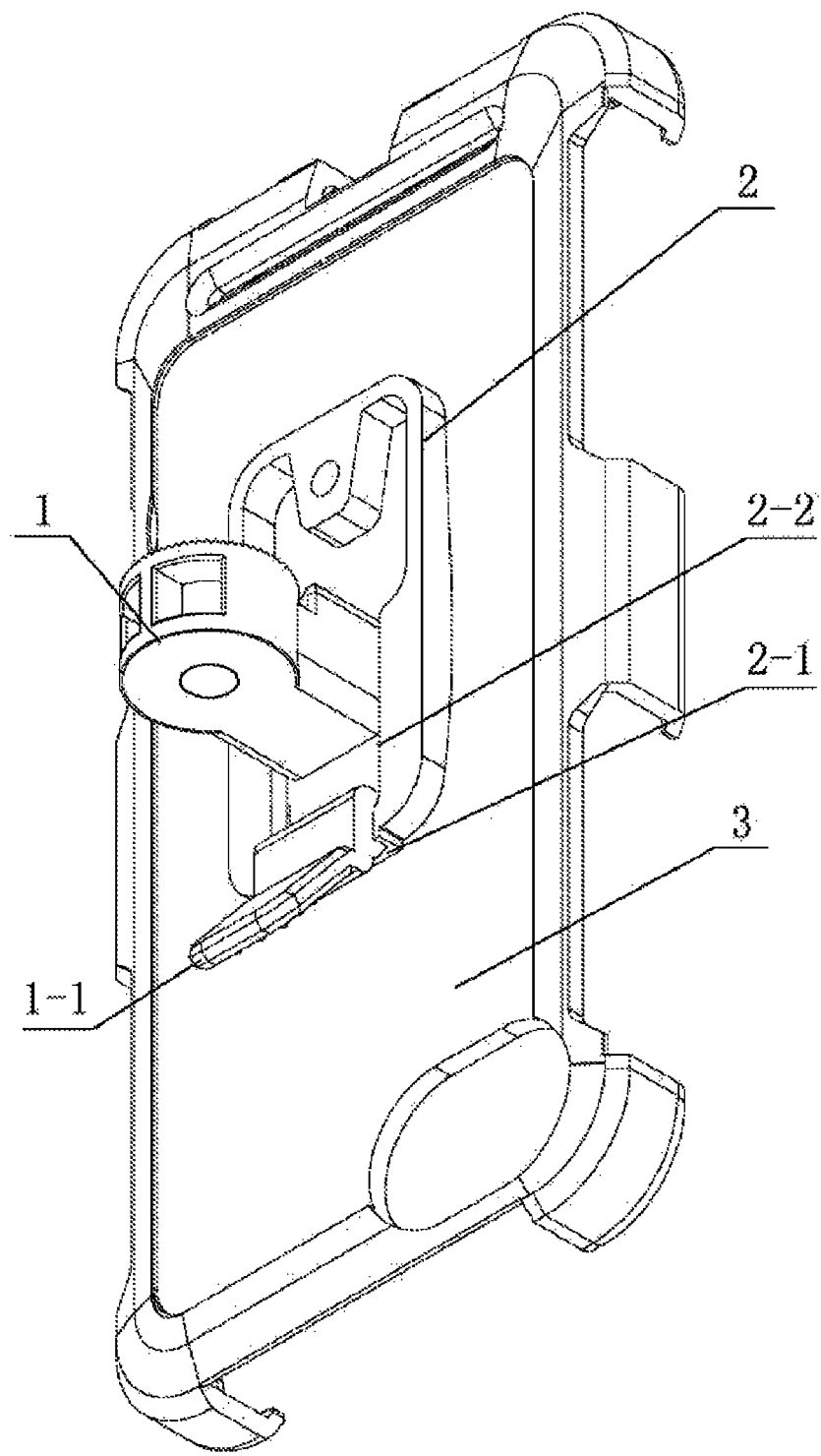
FIG. 4 is a perspective view of one embodiment of the presently claimed invention under an unlocked state.

In the following description, designs of apparatuses for securing and supporting mobile electronic devices are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the drawings, the number labels' definitions are: 1—male connector, 1-1—fastener, 2—female connector, 2-1—fastening end, 2-2—slot, and 3—protective shell.

As shown in the drawings, in accordance to one embodiment of the presently claimed invention, a mobile electronic device securing and supporting apparatus comprises a protective shell 3 for mounting the mobile electronic device and a support fixed to the supporting surface. The protective shell 3 and the support constitute a detachable connecting structure. The protective shell 3 is provided with a female connector 2. The female connector 2 is provided with a slot 2-2 and a fastening end 2-1 for connecting a male connector 1. The support is provided with a male connector 1. The size of the insertion end of the male connector 1 corresponds to the size of the slot 2-2. The male connecter 1 is provided a fastener 1-1. For connecting the male and female connectors, the male connector 1 is inserted into the slot 2-2 and connected with the female connector 2 in a sliding manner, then the fastener 1-1 of the male connector 1 is fastened to the fastening end 2-1 of the female connector 2, as such the male connector 1 is connected to the female connector 2.

Figure 5:
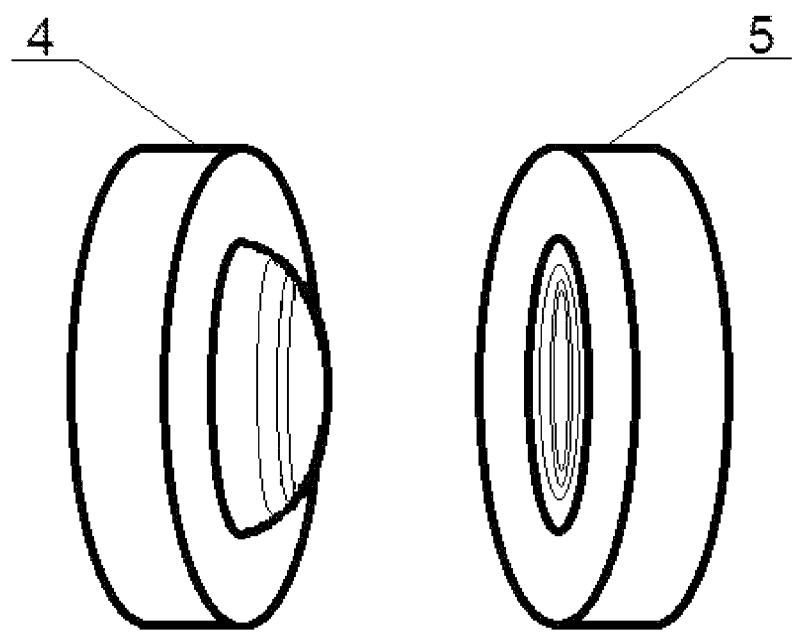
FIG. 5 is an enlarged view of the male connector magnet and the female Connector magnet in one embodiment of the presently claimed invention.

In accordance to one embodiment of the presently claimed invention, the interior of the male connector 1 is provided with an opening for installing magnet, in which a permanent magnet 4 having a convex shape is installed. The interior of the female connector 2 is provided with another opening for installing magnet, in which a permanent magnet 5 having a concave shape is installed. The magnetic poles of the exposed ends of the two magnets are of opposite of each other, and the sizes and placements of the two magnets correspond each other, so that when the male connector is inserted into the slot of the female connector, the female connector magnet 5 attracts the male connector magnet 4. An enlarged view of the male connector magnet 4 and the female connector magnet 5 is shown in FIG. 5.

To better guide the insertion of the male connector 1 into the slot 2-2 of the female connector 2, the preferred placements of the male connector magnet 4 and the female connector magnet 5 in this embodiment are as such: when the male connector magnet 4 attracts the female connector magnet 5 for connection, the male connector 1 is located at the starting end of the slot 2-2 of the female connector 2.

In actual use, firstly, the male connector 1 is brought in proximity with the female connector 2, allowing the male connector magnet 4 and the female connector magnet 5 to attract each other. The magnetic force exerted by the magnets guide the male connector 1 to align with the female connector 2 for inserting into the starting end of the slot 2-2 of the female connector 2, and draw the male connector 1 to slide into the inner side of the female connector 2 along the slot 2-2. Finally, the fastener 1-1 of the male connector 1 is fastened to the fastening end 2-1 of the female connector 2, and the male connector 1 and the female connector 2 are locked together. The male connector 1 and the female connector 2 are connected and secured together, the mobile electronic is embedded in the protective shell 3, the support is fixed to the supporting surface, and ultimately the mobile electronic device is properly secured and supported for use.

To detach the support from the protective shell, firstly loosen the fastener 1-1 of the male connector 1. Secondly, slide the male connector 1 outward away from the female connector 2. The male connector magnet 4 is attracted to the female connector magnet 5 such that to guide the male connector 1 to return to the starting end of the slot 2-2 of the female connector 2. Finally, the user pulls the male connector 1 out from the female connector 2 to complete the detachment. This way, the user's sight on the protective shell-support joining and detachment processes is not necessary.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An apparatus for securing and supporting a mobile electronic device, comprising:
   a protective shell for mounting the mobile electronic device, the protective shell comprising a first connector, wherein the first connector having a first magnet; and
   a support for fixing to a supporting surface, the support comprising a second connector, wherein the second connector having a second magnet;
   wherein the protective shell and the support constitute a detachable connecting structure;
   wherein exposed ends of the first magnet and the second magnet having opposite magnetic poles;
   wherein the first connector being a female connector and further comprising a slot and a fastening end; and
   wherein the second connector being a male connector and further comprising a fastener;
   such that when connecting the first and second connectors, the second connector is inserted into the slot of the first connector in a sliding manner, then the fastener of the second connector is fastened to the fastening end of the first connector.

2. The apparatus of claim 1,
   wherein the first magnet having a concave shape; and
   wherein the second magnet having a convex shape.

* * * * *